(12) United States Patent  
Mori et al.

(10) Patent No.: US 8,531,703 B2  
(45) Date of Patent: Sep. 10, 2013

(54) PRINT CONTROL PROGRAM, PRINT CONTROL METHOD, AND PRINTING SYSTEM FOR SAVING MORE RESOURCES THAN A FUNCTION SELECTED PRIOR TO THE INPUT OPERATION

(75) Inventors: Kazuo Mori, Osaka (JP); Yoshiaki Tanaka, Osaka (JP); Satoshi Awata, Osaka (JP); Shinichi Kawano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 746 days.

(21) Appl. No.: 12/761,697

(22) Filed: Apr. 16, 2010

(65) Prior Publication Data  
US 2010/0265546 A1  Oct. 21, 2010

(30) Foreign Application Priority Data  
Apr. 20, 2009  (JP) .................................. 2009-102001

(51) Int. Cl.  
G06F 15/00  (2006.01)

(52) U.S. Cl.  
USPC ....................................................... 358/1.15

(58) Field of Classification Search  
USPC ....................................................... 358/1.15  
See application file for complete search history.

(56) References Cited

U.S. PATENT DOCUMENTS

| | | | |
|---|---|---|---|
| 2002/0026453 A1* | 2/2002 | Mori et al. ................. | 707/104.1 |
| 2002/0071689 A1* | 6/2002 | Miyamoto ..................... | 399/53 |
| 2008/0008508 A1 | 1/2008 | Mizobuchi et al. | |

FOREIGN PATENT DOCUMENTS

| | | |
|---|---|---|
| JP | 2003-248576 | 9/2003 |
| JP | 2003-260857 | 9/2003 |
| JP | 2003-271367 | 9/2003 |
| JP | 2004-318694 | 11/2004 |
| JP | 4229955 | 1/2008 |

* cited by examiner

*Primary Examiner* — Qian Yang  
(74) *Attorney, Agent, or Firm* — Edwards Wildman Palmer LLP; David G. Conlin; Steven M. Jensen

(57) ABSTRACT

If, in the printing window displayed on the display according to the printer driver, the information processor is instructed to start printing, the control unit activates a program, displaying the main setting window at the front of the display. The main setting window shows images of resource saving buttons and a start decision button. Each of the resource saving buttons enables a user to select a printing function that can contribute to a resource saving more effectively than the already selected printing function or functions. The start decision button enables the user to decisively instruct the information processor to start the printing.

15 Claims, 9 Drawing Sheets

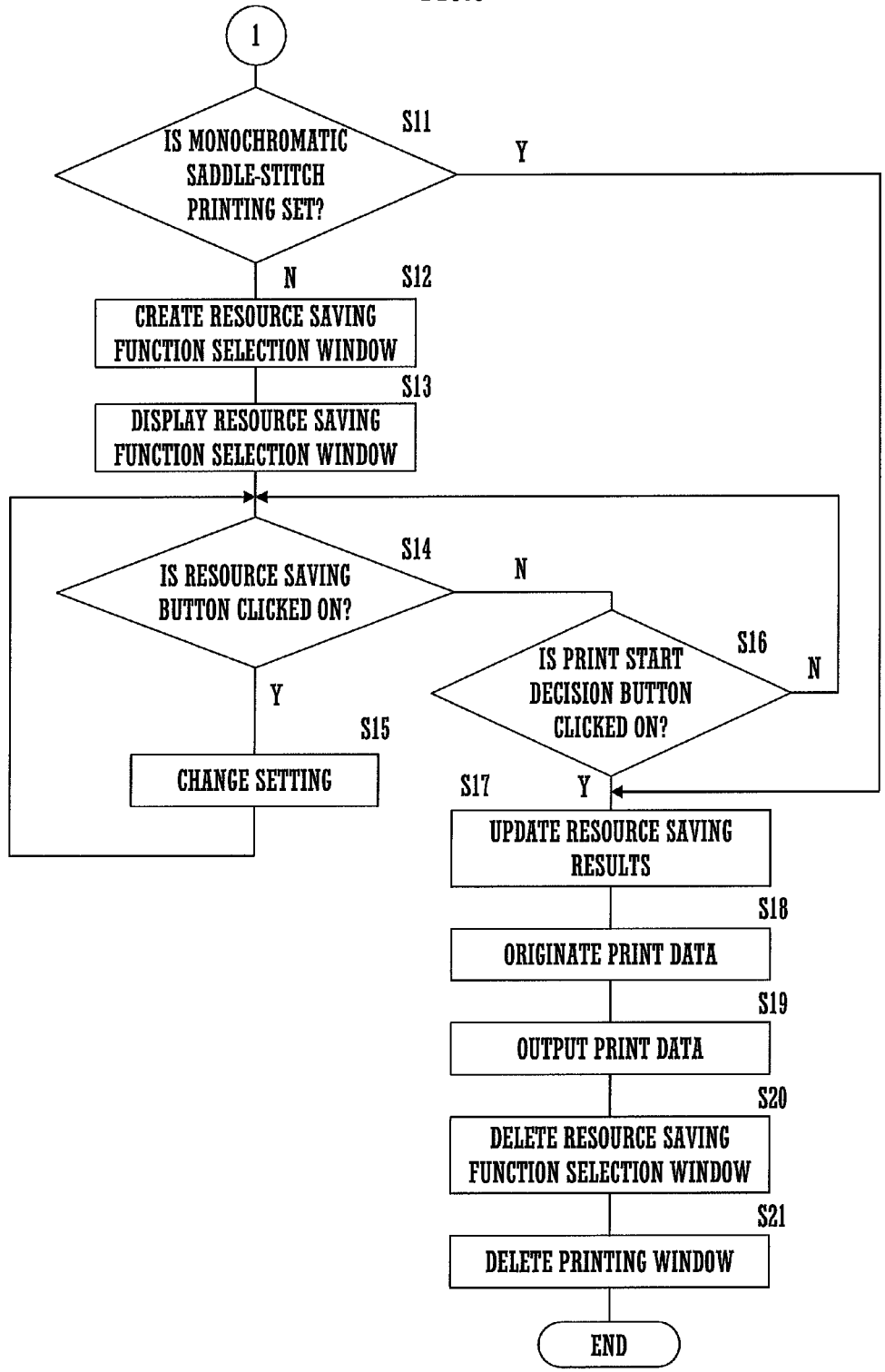

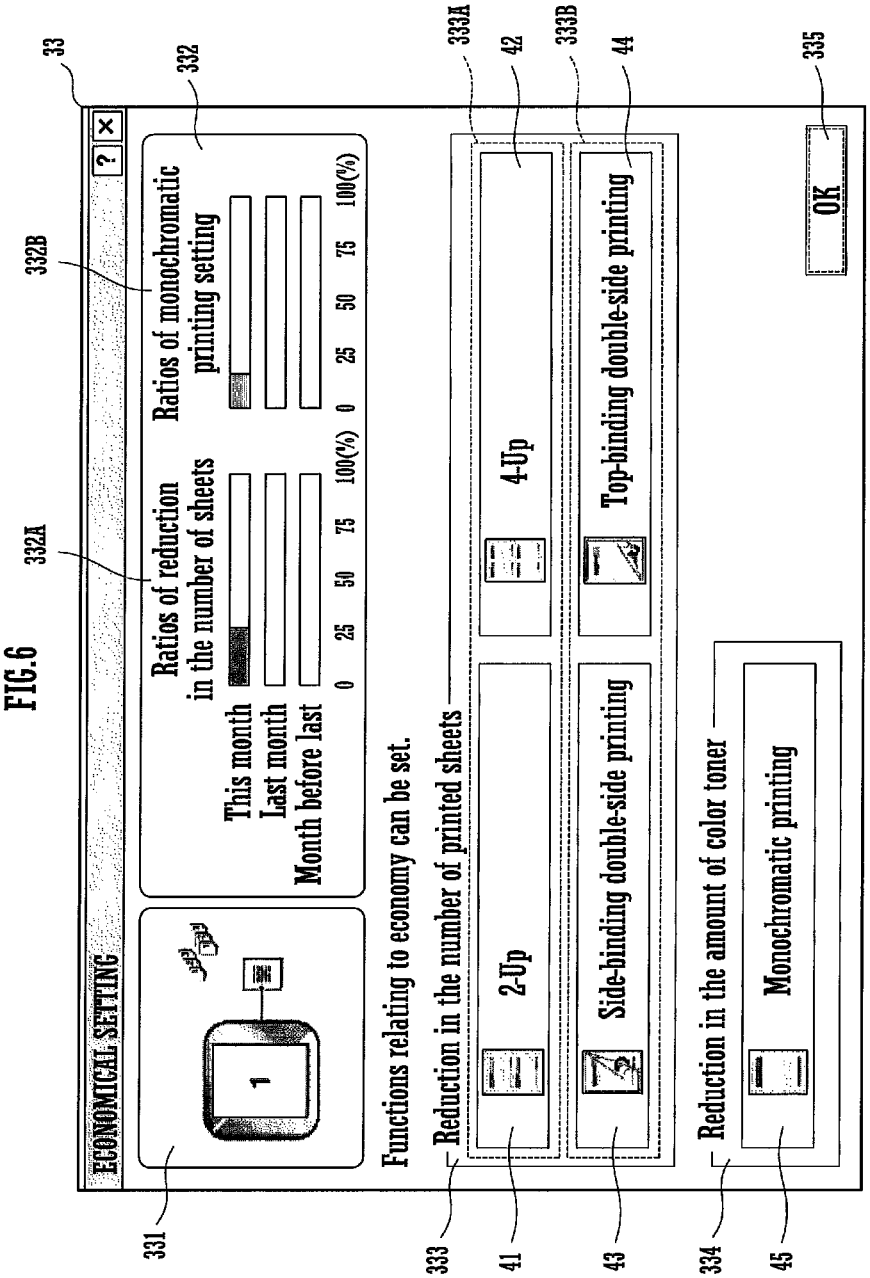

FIG.7

| | 212 |
|---|---|
| MA1 | FLAG F1 FOR 2-UP PRINTING |
| MA2 | FLAG F2 FOR 4-UP PRINTING |
| MA3 | FLAG F3 FOR SIDE-BINDING DOUBLE-SIDE PRINTING |
| MA4 | FLAG F4 FOR TOP-BINDING DOUBLE-SIDE PRINTING |
| MA5 | FLAG F5 FOR MONOCHROMATIC PRINTING |
| MA6 | TOTAL NUMBER OF PAGES PRINTED IN CURRENT MONTH |
| MA7 | NUMBER OF SHEETS PRINTED IN CURRENT MONTH |
| MA8 | NUMBER OF TIMES MONOCHROMATIC PRINTING WAS SET IN CURRENT MONTH |
| MA9 | TOTAL NUMBER OF TIMES PRINTING WAS DONE IN CURRENT MONTH |
| MA10 | RATIO OF REDUCTION IN THE NUMBER OF SHEETS IN PREVIOUS MONTH |
| MA11 | RATIO OF REDUCTION IN THE NUMBER OF SHEETS IN THE MONTH BEFORE PREVIOUS MONTH |
| MA12 | RATIO OF MONOCHROMATIC PRINTING SETTING IN PREVIOUS MONTH |
| MA13 | RATIO OF MONOCHROMATIC PRINTING SETTING IN THE MONTH BEFORE PREVIOUS MONTH |

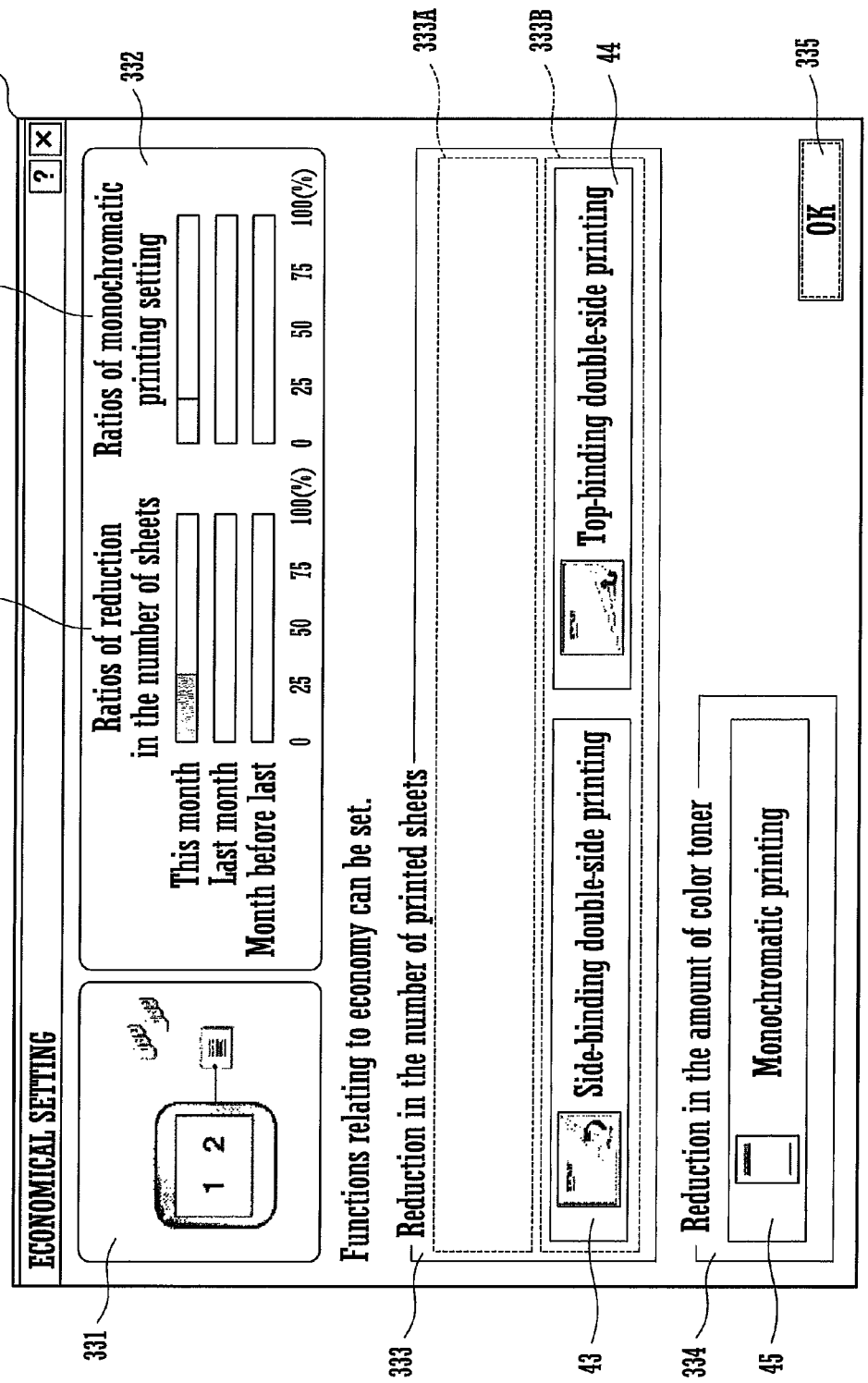

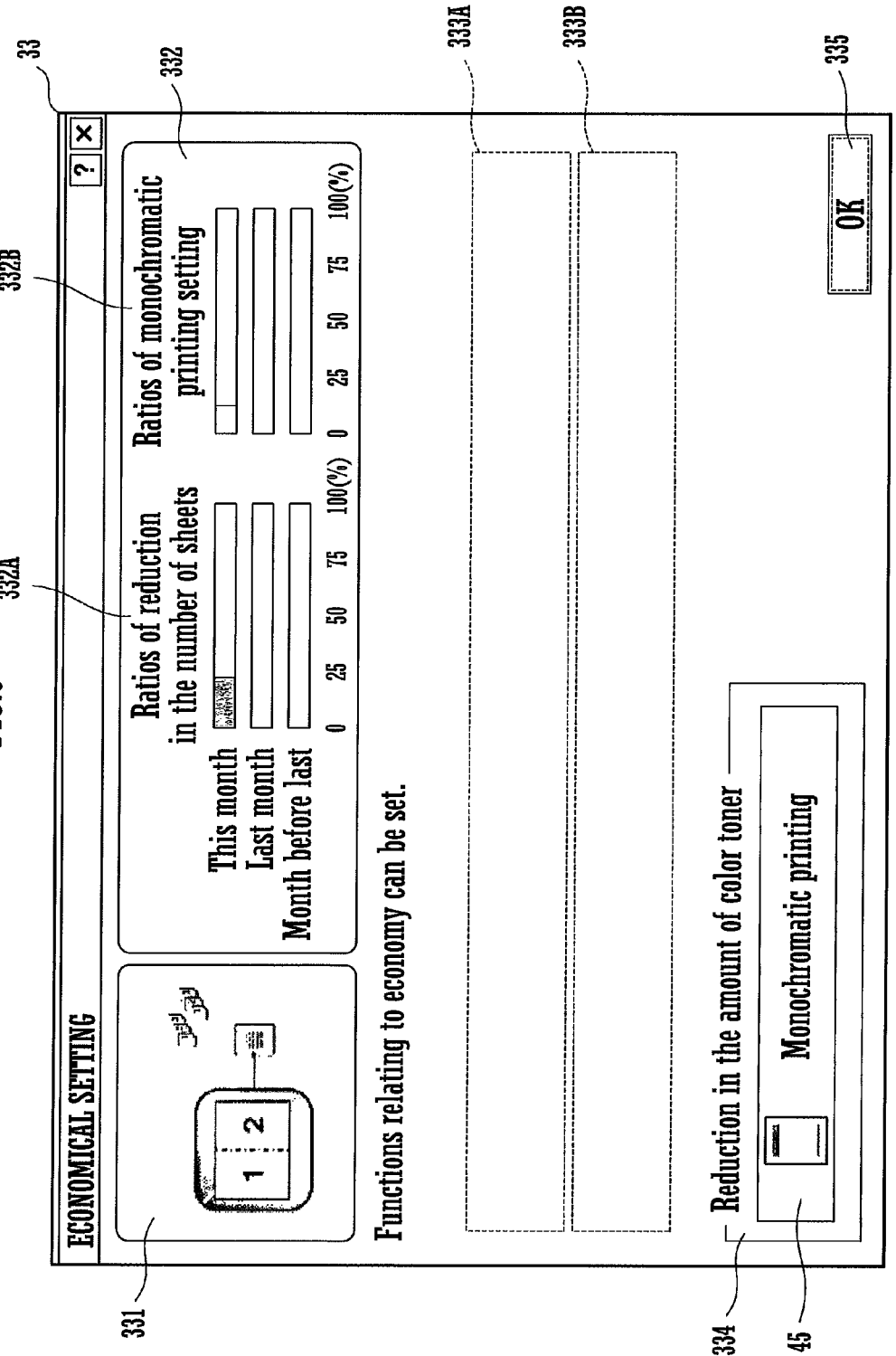

PRINT CONTROL PROGRAM, PRINT CONTROL METHOD, AND PRINTING SYSTEM FOR SAVING MORE RESOURCES THAN A FUNCTION SELECTED PRIOR TO THE INPUT OPERATION

CROSS REFERENCE

This Nonprovisional application claims priority under 35 U.S.C. §119(a) on Patent Application No. 2009-102001 filed in Japan on Apr. 20, 2009, the entire contents of which are hereby incorporated by reference.

BACKGROUND OF THE INVENTION

The present invention relates to a program and a method for controlling the printing by a printer, and to a printing system.

In recent years, from the perspective of terrestrial environment protection, it has been requested strongly to save printing paper, colorant, and other printing materials in the field of office work including the printing by printers. Some of the functions of printers promote resource savings by reducing the number of sheets of printing paper used by the printers. One of the promoting functions is a double-side printing function for the printing of images on both sides of a sheet. Another of these functions is an aggregate printing function for the printing of two or more shrunk images on one sheet.

A color printer can save resource by reducing the consumption of color ink, color toner or other colorant by printing less important color images as monochromatic images.

A user of a multi-function color printer can set many functions before printing. The setting is complicated or troublesome, so that functions of the printer that can contribute to resource savings may not be fully used.

JP-2003-271367-A discloses a print control program that improves users operability by making a dialog displayed so that a user can change settings before printing.

JP-4229955-B and JP-2003-248576-A disclose systems that promote the use of functions capable of contributing to resource savings by users. One of these systems calculates and displays the resource reduction achieved if a user changes settings. The other system tabulates the reduction in the number of sheets of printing paper per user and ratios of reduction in the number of sheets of printing paper.

For the conventional printer and print control program, no careful consideration is given to the visibility of the settings required for the use of functions capable of contributing to resource savings, and to the operability for changing the settings. This makes it impossible for users to select such functions easily and reliably.

The object of the present invention is to provide a print control program, a print control method and a printing system that are improved in the visibility of the settings required for the use of functions more capable of contributing to resource savings and the operability for changing the settings, and that enable users to select such functions easily and reliably.

SUMMARY OF THE INVENTION

A print control program and a print control method according to the present invention make an information processor control a printer. The processor is connected to the printer and has a display. The printer has first and second functions of two or more sorts. The second functions can contribute to resource savings. The program and method include a first step, a second step and a third step. The processor executes the first step after a user selects at least one of the functions.

In the first step, the information processor waits for the user to enter into it an instruction to start printing.

In the second step, the information processor displays a resource saving function selection window on the display when the processor detects the instruction entry. The window shows at least one selector image and a start decider image. The selector image enable the user to select the second function of at least one of the sorts other than the sort to which the function selected before the instruction entry belong. The start decider image enables the user to decisively instruct the processor to start printing by the printer.

In the third step, the information processor makes the printer start printing according to the selected functions when the user manipulates the start decider image to decisively instruct the processor to start printing by the printer.

BRIEF DESCRIPTION OF THE DRAWINGS

FIG. 5 is a flowchart exemplifying the processing that the control unit executes according to the print control program installed in the printing system and embodying part of the present invention.

FIG. 6 shows a pattern of the resource saving function selection window displayed according to the print control program.

FIG. 7 shows part of the memory map stored in the memory unit of the printing system.

FIG. 8 shows another pattern of the resource saving function selection window.

FIG. 9 shows still another pattern of the resource saving function selection window.

DETAILED DESCRIPTION OF THE INVENTION

Figure 1:
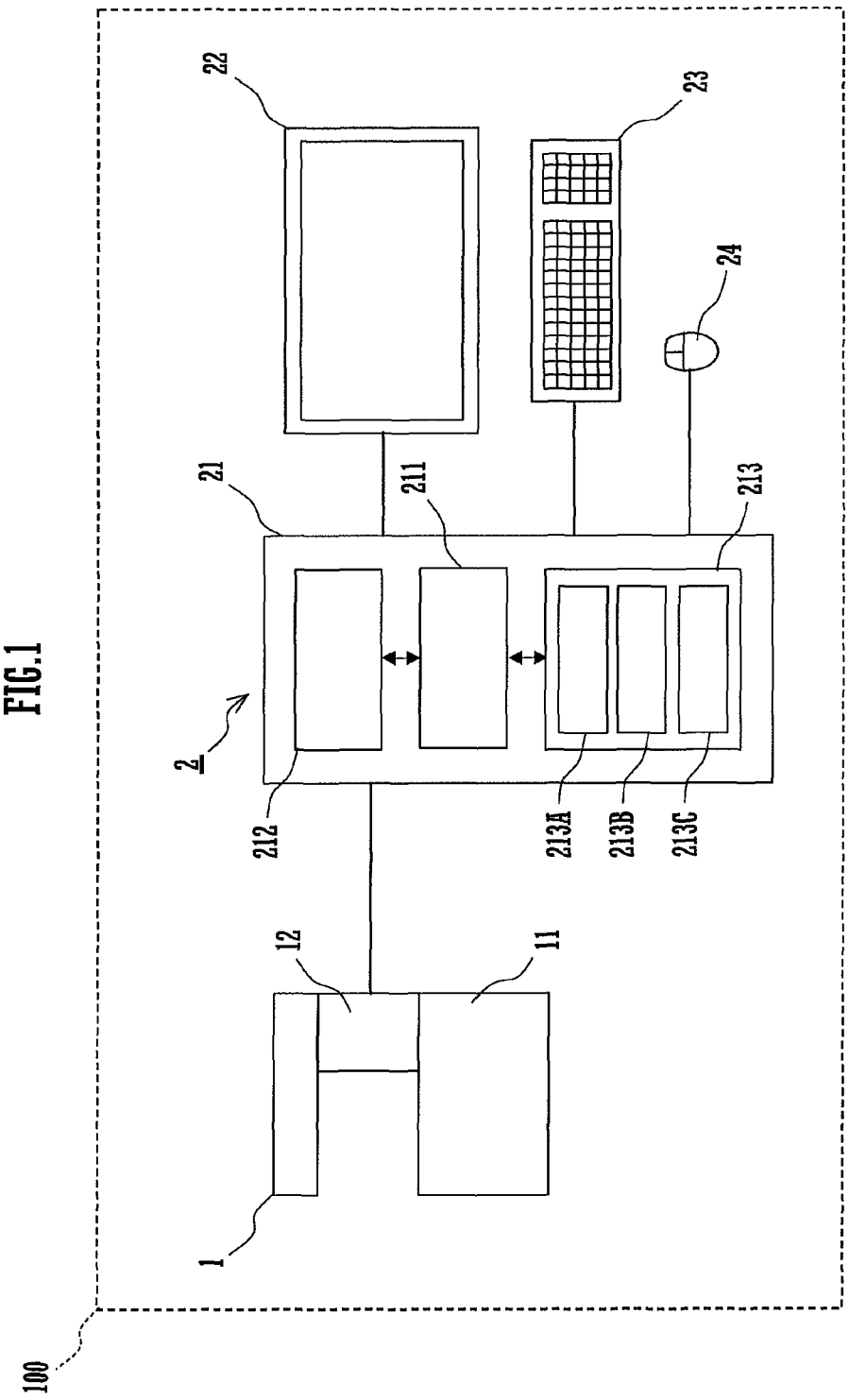
FIG. 1 is a block diagram of a printing system embodying the present invention.

With reference to FIG. 1, a printing system 100 embodying the present invention consists of a printer 1 and an information processor 2 that are connected together.

The printer 1 includes a paper feeding unit 11 and an image forming unit 12. The paper feeding unit 11 feeds the image forming unit 12 with a sheet of printing paper or another record medium made of OHP film or a material other than paper. The image forming unit 12 forms a color or monochromatic image on the sheet based on print data. The printer 1 may be a multi-function printer for electrophotographic printing. An electrophotographic printer, an ink jet printer and other printers might be connected to the information processor 2.

The information processor 2 may be a personal computer and includes a main body 21, a display 22, a keyboard 23, and a mouse 24. The main body 21 includes a control unit 211, which has a memory unit 212 and a program storage unit 213.

The control unit 211 is connected to the display 22, keyboard 23, and mouse 24, and also connected to the printer 1 directly or via a network.

The program storage unit 213 has an operating system (not shown), an application program 213A for data creation, a printer driver 213B and a print control program 213C that are installed in it. The control unit 211 controls the operation of the printer 1 with the driver 213B during printing. The control program 213C embodies part of the present invention.

The control unit 211 operates according to the programs in the program storage unit 213. While the application program 213A is active, the control unit 211 creates image data, which includes document data, based on the data entered by means of the keyboard 23 and mouse 24. The control unit 211 converts the created image data into display data, displays the display data on the display 22, and stores the image data in the memory unit 212.

While the printer driver 213B is active, the control unit 211 creates print data from the image data in the memory unit 212 based on the data entered by means of the keyboard 23 and mouse 24. The control unit 211 outputs the created print data to the printer 1 via an interface (not shown).

Figure 2:
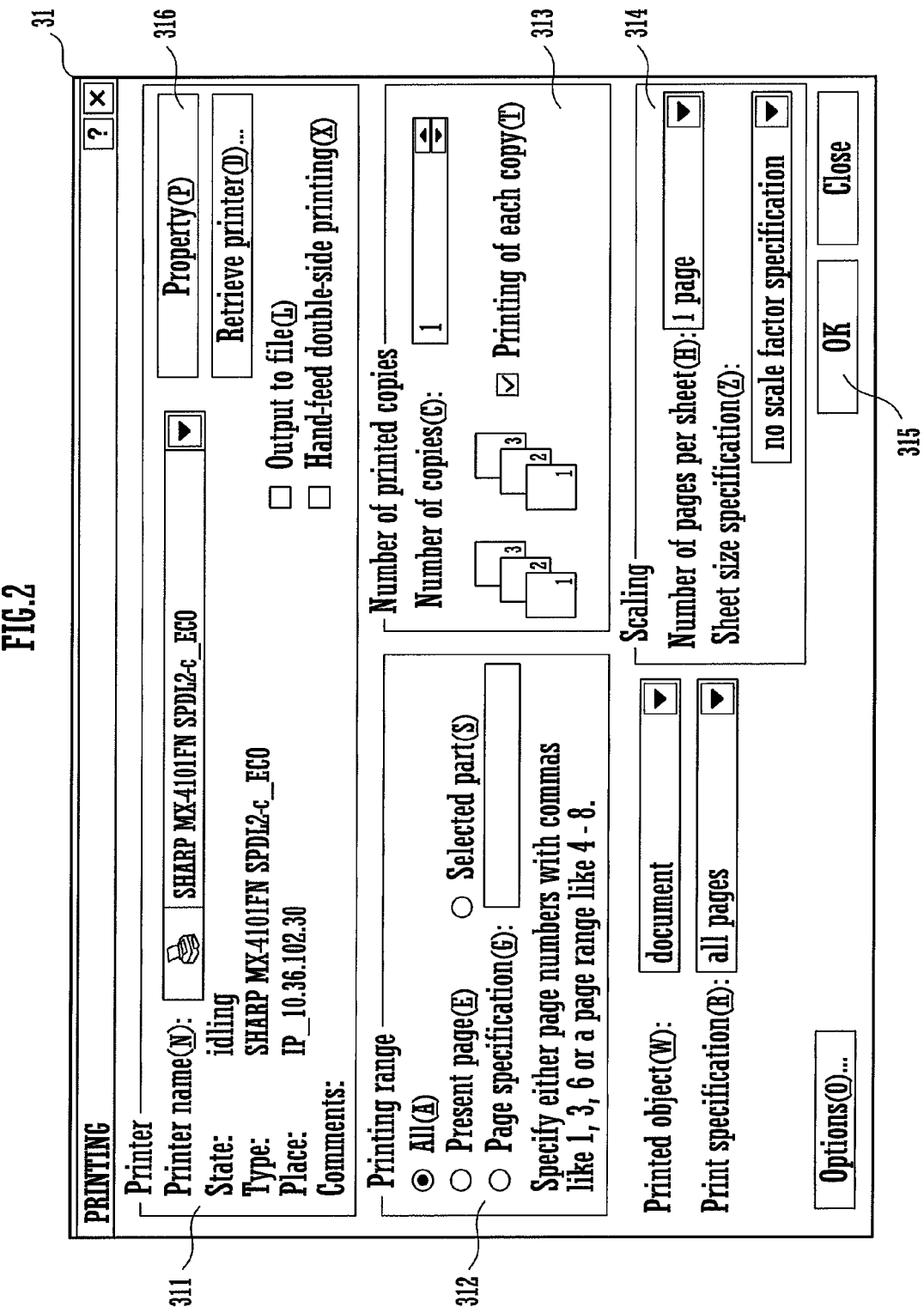
FIG. 2 is an exemplification of the printing window displayed according to the printer driver installed in the printing system.

If a user requests printing by means of the keyboard 23 or mouse 24 while the application program 213A is active, the control unit 211 activates the printer driver 213B, so that a printing window 31 as exemplified by FIG. 2 appears on the display 22.

With reference to FIG. 2, a printer setting area 311, a print range area 312, an area 313 for the number of copies, a scaling area 314 and a print start button 315 are laid out in the printing window 31.

In the print range area 312, the user specifies the range that needs to be printed of the image data created with the application program 213A.

In the area 313 for the number of copies, the user specifies the number of copies that needs to be printed of the specified range of the image data.

The scaling area 314 shows settings for or computation results about the number of pages per sheet and sheet size as information necessary for the decision of the scale factor at which an image needs to be formed on sheets of printing paper.

The name of the printer 1 is shown in the printer setting area 311. If the information processor 2 were connected to two or more printers, the user could select one of them in the area 311. In the area 311, a property button 316 is provided for the confirmation of settings. If the user clicks on the property button 316 by means of the mouse 24, a main setting window 32 as exemplified by FIG. 3 appears on the display 22.

Figure 3:
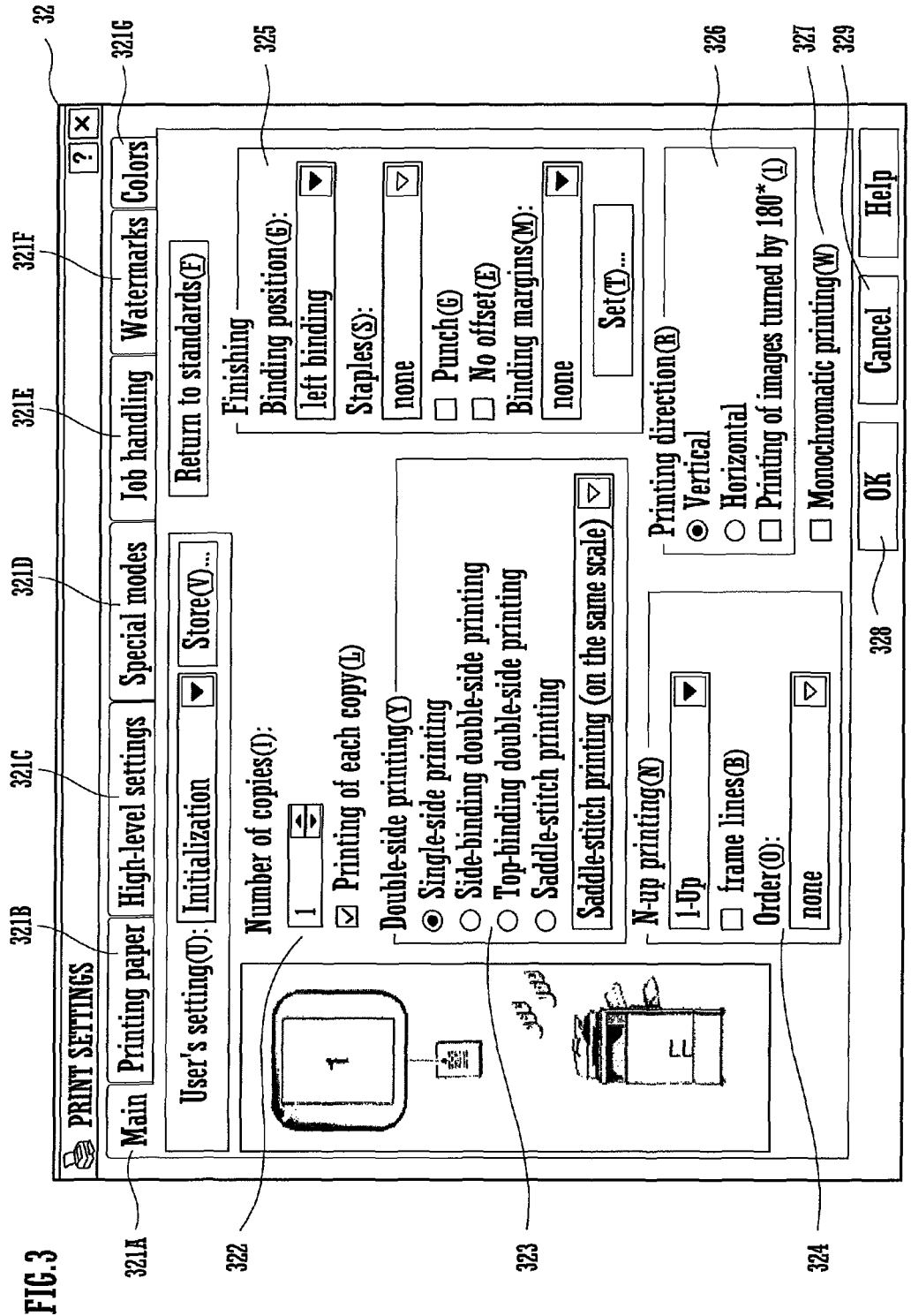
FIG. 3 is an exemplification of the main setting window displayed according to the printer driver.

With reference to FIG. 3, the main setting window 32 has pages 321A-321G, each of which shows functions of the printer and settings for them, and on which the settings can be changed. For example, the main page 321A has areas 322-327, where the user can change the settings of the number of copies, double-side printing, aggregate printing, finishing, printing direction and monochromatic printing respectively.

The main setting window 32 also has a decision button 328 and a cancel button 329 as setting completion buttons, on which the user clicks when the user has confirmed or changed settings. The user clicks on the decision button 328 to decide changed settings. The user clicks on the cancel button 329 to cancel changed settings.

Figure 4:
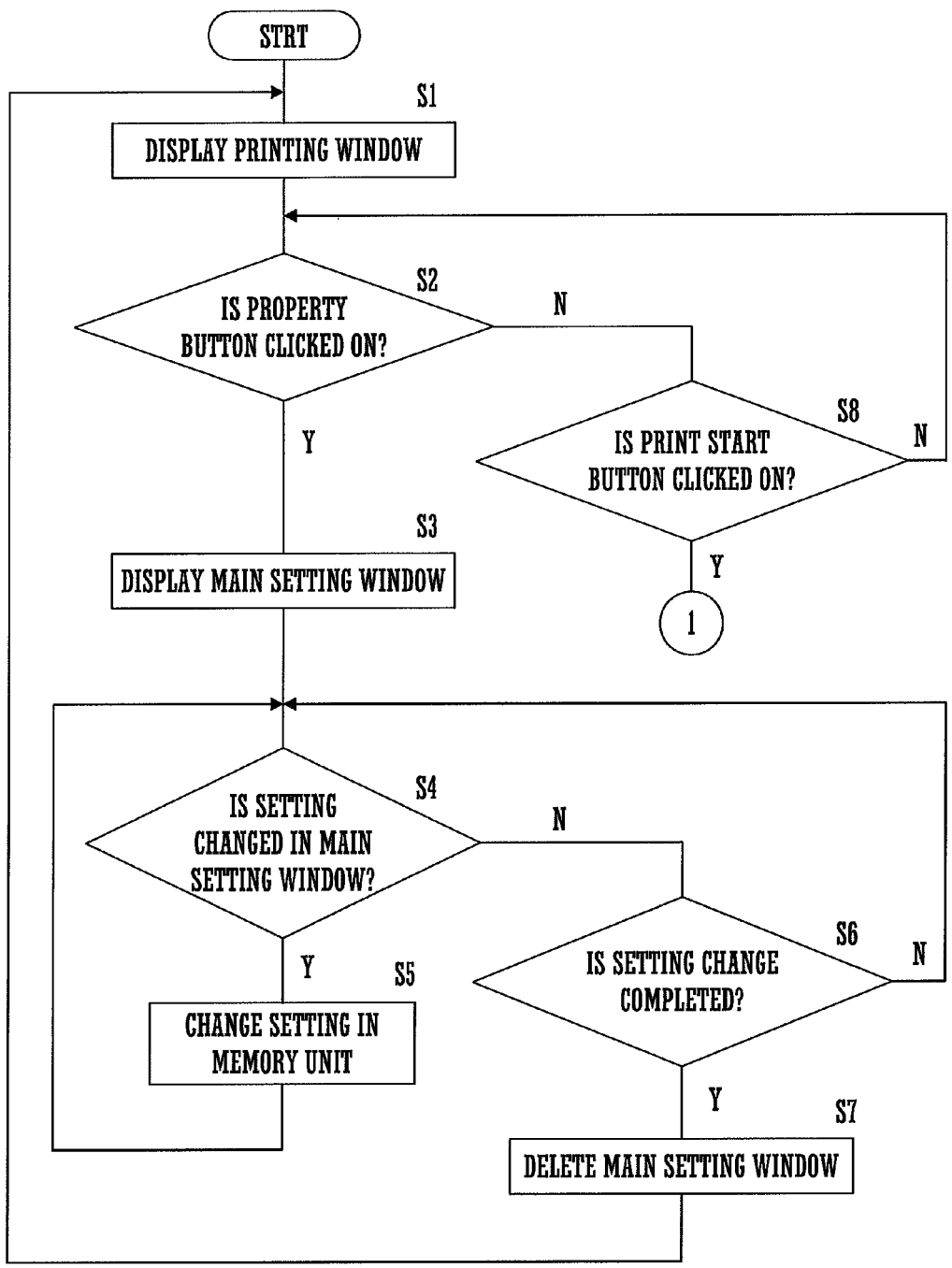
FIG. 4 is a flowchart exemplifying the processing that the control unit of the printing system executes according to the printer driver.

With reference to FIG. 4, if a user requests printing by means of the keyboard 23 or mouse 24 while the application program 213A is active, the control unit 211 displays the printing window 31 (FIG. 2) at the front of the display 22 (S1) and waits for the user's operation. If the user requests the confirmation of settings by clicking on the property button 316 in the printing window 31 (S2), the control unit 211 displays the main setting window 32 (FIG. 3) at the front of the display 22 (S3) and waits for the user to change settings.

If the user changes settings in the main setting window 32 (S4), the control unit 211 changes the corresponding settings in the memory unit 212 (S5). If the user clicks on one of the decision button 328 and cancel button 329 as the setting completion buttons in the main setting window 32 (S6), the control unit 211 deletes the main setting window 32 from the display 22 (S7). Then, the processing goes back to step S1, where the control unit 211 displays the printing window 31 at the front of the display 22.

If the user clicks on the print start button 315 by means of the mouse 24 (S8) while the printing window 31 is displayed on the display 22, the control unit 211 activates the print control program 213C in the program storage unit 213.

With reference to FIG. 5, with the print control program 213C activated, the control unit 211 determines whether monochromatic saddle-stitch printing is set (S11). If not, the control unit 211 creates a resource saving function selection window 33 as exemplified by FIG. 6 (S12) and displays it at the front of the display 22 (S13).

With reference to FIG. 6, the resource saving function selection window 33 has a printing condition display area 331, a resource saving result display area 332, an area 333 for the reduction in the number of printed sheets, an area 334 for the reduction in the amount of colorant, and a print start decision button 335.

Some of the functions of the printer 1 can contribute to resource savings. The user can set one or more of the functions that can contribute to resource savings. The printing condition display area 331 shows the printing condition assumed by the printer 1 when the set function or functions that can contribute to resource savings are performed.

In the area 333 for the reduction in the number of printed sheets, the user can set one or two of the functions that can contribute to resource savings by reducing the number of sheets of printing paper used by the printer. The area 333 includes an aggregate printing setting area 333A and a double-side printing setting area 333B.

The aggregate printing setting area 333A shows images of resource saving buttons 41 and 42 for a 2-up printing function and a 4-up printing function respectively, which are aggregate printing functions. These functions make it possible to shrink print data for two or four pages and print the shrunk data into one side of a sheet. The aggregate printing functions relate to the print appearance into one side of a sheet and correspond to functions of a first sort of the present invention.

The double-side printing setting area 333B shows images of resource saving buttons 43 and 44 for a side-binding double-side printing function and a top-binding double-side printing function respectively. The double-side printing functions make it possible to print different print data on both sides of a new sheet. The double-side printing functions relate to the sides of a sheet on which the printer 1 does printing. These functions correspond to functions of a second sort of the present invention.

In the area 334 for the reduction in the amount of colorant, the user can set the other function that can contribute to a resource saving by reducing the amount of colorant such as toner or ink used in the printer 1. The area 334 shows an image of a resource saving button 45 for a monochromatic printing function. This function makes it possible to convert color image data into monochromatic print data for the printing of the color image data as a monochromatic image so as to reduce the amount of color toner or color ink used in the printer 1. The monochromatic printing function corresponds to functions of a third sort of the present invention. The third sort relates to a condition in which colorant is used.

The user can click on one or more of the resource saving buttons 41-45 to select the associated function or functions that can contribute to resource savings.

The user clicks on the print start decision button 335 so as to decisively instruct the information processor 2 to start the printing by the printer 1. If the button 335 is clicked on, the processor 2 converts image data into print data according to the set functions and outputs the print data to the printer 1.

The resource saving result display area 332 shows results of the resource savings achieved in the printing done by the printer 1. The area 332 includes an area 332A showing ratios of reduction in the number of sheets and an area 332B showing ratios of monochromatic printing setting.

The area 332A showing ratios of reduction in the number of sheets shows results of the reduction in the number of sheets of printing paper used by the printer 1. Specifically, the area 332A shows monthly ratios of reduction in the number of sheets for three months. Each of these ratios is the value found by dividing the number of printed sheets by the number of pages of image data, subtracting the quotient from 1, and showing the remainder in a percentage.

The area 332B showing ratios of monochromatic printing setting shows results of the reduction in the amount of colorant used in the printer 1. Specifically, the area 332B shows monthly ratios of monochromatic printing setting for three months. Each of these ratios is the percentage of the monochromatic print instructions from the information processor 2 to the printer 1 to all the print instructions from the processor to the printer.

With reference to FIG. 5, if any one of the resource saving buttons 41-45 is clicked on (S14), the control unit 211 so changes settings (S15) that the function associated with the button clicked on can be used.

If the print start decision button 335 is clicked on (S16), the control unit 211 updates the resource saving results stored in the memory unit 212 (S17), converts the image data in the memory unit into print data (S18), and outputs the print data to the printer 1 (S19). Subsequently, the control unit 211 deletes the resource saving function selection window 33 and printing window 31 (S20, S21) and terminates the processing.

When the control unit 211 creates a resource saving function selection window 33 in step S12 and creates the print data in step S18, this unit refers to the contents in the memory unit 212.

With reference to FIG. 7, the memory unit 212 has memory areas MA1-MA13 and a date storage area (not shown).

The memory areas MA1-MA5 are allocated to flags F1-F5 respectively. The flag F1 indicates whether the 2-up printing function is selected. The flag F2 indicates whether the 4-up printing function is selected. The flag F3 indicates whether the side-binding double-side printing function is selected. The flag F4 indicates whether the top-binding double-side printing function is selected. The flag F5 indicates whether the monochromatic printing function is selected.

Based on the settings made in the areas 323, 324 and 327 in the main setting window 32 when the decision button 328 in it is clicked on in step S6, the control unit 211 sets or resets the flags F1-F5. For example, if the user selects, in step S4, the 2-up printing function in the area 324 and clicks on the decision button 328 in step S6, the control unit 211 sets the flag F1 in the memory area MA1.

If, in step S14, one of the resource saving buttons 41-45 in the resource saving function selection window 33 is clicked on, the control unit 211 sets the associated flag F1, F2, F3, F4 or F5. For example, if the user clicks on the resource saving button 41 in step S14, the control unit 211 sets the flag F1 in the memory area MA1.

With reference to FIG. 7, the memory areas MA6-MA13 are allocated for storing the total number of pages printed in the current month, the number of sheets printed in the current month, the number of times monochromatic printing was set in the current month, the total number of times printing was done in the current month, the ratio of reduction in the number of sheets in the previous month, the ratio of reduction in the number of sheets in the month before the previous month, the ratio of monochromatic printing setting in the previous month, and the ratio of monochromatic printing setting in the month before the previous month respectively.

In step S17, the control unit 211 adds, to the total number of pages (printed in the current month) stored in the memory area MA6, the number of pages of image data printed at the current time. In step S17, the control unit 211 also adds, to the number of sheets (printed in the current month) stored in the memory area MA7, the number of sheets printed at the current time. In step S17, the control unit 211 increments the number of times (printing was done in the current month) stored in the memory area MA9. In step S17, if the monochromatic printing function is selected for the printing at the current time, the control unit 211 also increments the number of times (monochromatic printing was selected in the current month) stored in the memory area MA8. In step S17, the control unit 211 updates the contents of the memory areas MA6-MA13 on the first day of each month with reference to the contents in the date storage area in the memory unit 212.

When the control unit 211 creates a resource saving function selection window 33 in step S12, this unit changes, according to the states of the flags F1-F5 in the memory areas MA1-MA5, the contents of the area 333 for the reduction in the number of printed sheets and the area 334 for the reduction in the amount of colorant in this window and creates, according to the contents of the memory areas MA6-MA13, the contents of the printing condition display area 331 and resource saving result display area 332 in this window.

If the flag F1 or F2 is set, the control unit 211 omits, as shown in FIG. 8, the display of the aggregate printing setting area 333A from the area 333 for the reduction in the number of printed sheets. If the flag F3 or F4 is set in addition, the control unit 211 omits, as shown in FIG. 9, the display of the aggregate printing setting area 333A and double-side printing setting area 333B from the area 333. If the flags F1 and F2 are reset, and if the flag F3 or F4 is set, the control unit 211 omits the display of only the double-side printing setting area 333B. If the flag F5 is set, the control unit 211 omits to display the area 334 for the reduction in the amount of colorant.

If the user selects the saddle-stitch printing for printing two pages of image data of A4 size on each side of a sheet of A3 size, the control unit 211 omits the display of the aggregate printing setting area 333A and double-side printing setting area 333B from the area 333 for the reduction in the number of printed sheets, because the printing conditions requested by the user are not suitable for the reduction in the number of sheets. For a similar reason, if monochromatic saddle-stitch printing is set in step S11, there is no need to select monochromatic printing and display the resource saving function selection window 33. In this case, the control unit 211 skips steps S12-S16 and executes steps S17-S21.

In step S12, the control unit 211 computes the ratio of reduction in the number of sheets in the current month based on the contents of the memory areas MA6 and MA7 and displays the computed ratio in the area 332A in the resource saving function selection window 33. In step S12, the control unit 211 also computes the ratio of monochromatic printing setting in the current month based on the contents of the memory areas MA8 and MA9 and displays the computed ratio in the area 332B in the window 33.

When the control unit 211 creates print data in step S18, this unit refers to the states of the flags F1-F5 in the memory areas MA1-MA5. If the flag F1 is set, the control unit 211 creates, for one side of each sheet of printing paper, print data consisting of two pages of image data. If the flag F2 is set, the control unit 211 creates, for one side of each sheet of printing paper, print data consisting of four pages of image data.

If the flag F3 is set, the control unit 211 may create print data, with image data offset to the right. If the flag F4 is set, the control unit 211 may create print data, with image data offset downward. If the flag F3 or F4 is set, the control unit 211 outputs a double-side printing command with the print data to the printer 1.

If the flag F5 is set, the control unit 211 converts color image data into monochromatic print data.

When the user instructs the information processor 2 to start printing in the printing window 31, which is displayed according to the printer driver 213B, the control unit 211 displays the resource saving function selection window 33 at the front of the display 22 so that the user can, in this window, select one or more of the functions that can contribute more effectively to resource savings than the currently set function or functions. This makes it easy for the user to recognize and select one or more of the functions that can contribute more effectively to resource savings than the currently set function or functions. As a result, the resource savings by the user can be promoted.

In order to so convert image data into print data that the printer 1 fulfills part or all of the functions that can contribute to resource savings, the control unit 211 may, when the print start decision button 335 is clicked on, output to the printer 1 the print or image data with a command to perform part or all of the set functions.

The double-side printing functions involve reversing the sides of a sheet of printing paper and then feeding it again into the printer 1. Therefore, if one of the double-side printing functions is selected, the control unit 211 outputs to the printer 1 a command to perform this function.

The print control program 213C, which embodies part of the present invention, might be part of the printer driver 212B. Alternatively, the print control program 213C could, independently of the printer driver 212B, cooperate with it or any one of the other printer drivers that might be installed in the program storage unit 213.

It is not essential that the print control program 213C be installed in the information processor 2. If the printer 1 were fitted with a display, the print control program 213C might be installed in the printer. The print control program 213C might be installed in a print server on a network.

A print control program according to the present invention can also be applied to a printing system including a monochromatic printer. If the printer 1 were a monochromatic printer, the monochromatic printing button 45 could be omitted from the resource saving function selection window 33.

The resource saving function selection window 33 might have an area or areas where the user could select a function enabling the use of sheets printed into one side and/or a function enabling the lowering of print quality.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A print control program embodied in a non-transitory computer readable recording medium for making an information processor control a printer connected to the information processor, the information processor having a display, the printer having first and second functions of different kinds, the second function being capable of contributing to resource savings, the program comprising:
    a first step to wait for a user to perform an input operation to request confirmation of settings, and to display a main setting window at a front of the display of the information processor, the main setting window receiving the input operation to change the settings when the user requests the confirmation of the settings;
    a second step to display a resource saving function selection window at the front of the display of the information processor when the information processor detects the input operation, the window displaying, after erasing the main setting window, a selector image and a start decider image, the selector image enabling the user to select a function for saving more resources than a function selected prior to the input operation for the second function, the start decider image enabling the user to decisively instruct the processor to start printing by the printer; and
    a third step to make the printer start printing according to the second function when the user manipulates the start decider image to decisively instruct the information processor to start printing by the printer,
    wherein in the second step, the program displays in the resource saving function selection window the selector image which enables the user to select the second function for saving more resources as compared to the first function selected via the main setting window.

2. The print control program as claimed in claim 1, wherein the resource saving function selection window displayed in the second step shows: a printing condition display area showing a printing condition when the second function is performed; a resource saving result display area showing a result of the resource savings achieved in the printing; an area for reducing the number of sheets of printing paper, in which the user can set at least one function that can contribute to the resource savings by reducing the number of sheets of printing paper used for the printing; an area for the reduction in the amount of colorant, in which the user can set another function that can contribute to the resource savings by reducing the amount of colorant such as toner or ink used for the printing; and the start decider image which enables the user to decisively instruct the processor to start printing.

3. The print control program as claimed in claim 1, wherein the information processor further has a memory unit, the program further comprising a fourth step to store in the memory unit, after the processor is decisively instructed to start the printing in the third step, updated information showing a resource saving result.

4. The print control program as claimed in claim 3, wherein the resource saving function selection window displayed in the second step further shows an image indicating a reduction in the number of sheets of printing paper used by the printer.

5. The print control program as claimed in claim 4, wherein the resource saving function selection window displayed in the second step further shows an image indicating a reduction in the amount of colorant used by the printer.

6. The print control program as claimed in claim 3, wherein the resource saving function selection window displayed in the second step further shows an image indicating a reduction in the amount of colorant used by the printer.

7. The print control program as claimed in claim 1, wherein the second function is an aggregate printing function for aggregating a plurality of print pages into one side of a sheet of printing paper, a double-side print function, or a monochromatic printing function.

8. A print control method for controlling a printer by means of an information processor connected to the printer, the information processor having a display, the printer having first and second functions of different kinds, the second function being capable of contributing to resource savings, the method comprising:

a first step to wait for a user to perform an input operation to request confirmation of settings, and to display a main setting window at a front of the display of the information processor, the main setting window receiving the input operation to change the settings when the user requests the confirmation of the settings;

a second step to display a resource saving function selection window at the front of the display of the information processor when the information processor detects the input operation, the window displaying, after erasing the main setting window, a selector image and a start decider image, the selector image enabling the user to select a function for saving more resources than a function selected prior to the input operation for the second function, the start decider image enabling the user to decisively instruct the processor to start printing by the printer; and a third step to make the printer start printing according to the second function when the user manipulates the start decider image to decisively instruct the information processor to start printing by the printer, wherein in the second step, the program displays in the resource saving function selection window the selector image which enables the user to select the second function for saving more resources as compared to the first function selected via the main setting window.

9. The print control method as claimed in claim 8, wherein the resource saving function selection window displayed in the second step shows: a printing condition display area showing a printing condition when the second function is performed; a resource saving result display area showing a result of the resource savings achieved in the printing; an area for reducing the number of sheets of printing paper, in which the user can set at least one function that can contribute to the resource savings by reducing the number of sheets of printing paper used for the printing; an area for the reduction in the amount of colorant in which the user can set another function that can contribute to the resource savings by reducing the amount of colorant such as toner or ink used for the printing; and the start decider image which enables the user to decisively instruct the processor to start printing.

10. The print control method as claimed in claim 8, wherein the information processor further has a memory unit, the method further comprising a fourth step to store in the memory unit, after the processor is decisively instructed to start the printing in the third step, updated information showing how the functions are used.

11. The print control method as claimed in claim 10, wherein the resource saving function selection window displayed in the second step further shows an image indicating how a function relating to the reduction in the number of sheets of printing paper used by the printer is used.

12. The print control method as claimed in claim 11, wherein the resource saving function selection window displayed in the second step further shows an image indicating how a function relating to the reduction in the amount of colorant used by the printer is used.

13. The print control method as claimed in claim 10, wherein the resource saving function selection window displayed in the second step further shows an image indicating how a function relating to the reduction in the amount of colorant used by the printer is used.

14. The print control method as claimed in claim 8, wherein the second function is an aggregate printing function for aggregating a plurality of print pages into one side of a sheet of printing paper, a double-side print function, or a monochromatic printing function.

15. A printing system comprising: a printer for forming an image on a sheet of paper by means of printing based on print data; an information processor connected to the printer; and a program storage unit in which the print control program as claimed in claim 1 is stored.

* * * * *